(12) United States Patent
Fiedler et al.

(10) Patent No.: US 7,577,484 B2
(45) Date of Patent: Aug. 18, 2009

(54) DEVICE AND METHOD FOR THE CONFIGURATION OF A MICROSCOPE

(75) Inventors: Frank Fiedler, Wetzlar (DE); Reiner Jung, Langgoens (DE)

(73) Assignee: Leica Microsystems CMS GmbH, Wetzlar (DE)

( * ) Notice: Subject to any disclaimer, the term of this patent is extended or adjusted under 35 U.S.C. 154(b) by 332 days.

(21) Appl. No.: 10/596,736

(22) PCT Filed: Dec. 3, 2004

(86) PCT No.: PCT/EP2004/053256

§ 371 (c)(1),
(2), (4) Date: Jun. 22, 2006

(87) PCT Pub. No.: WO2005/062104

PCT Pub. Date: Jul. 7, 2005

(65) Prior Publication Data
US 2007/0159686 A1    Jul. 12, 2007

(30) Foreign Application Priority Data
Dec. 22, 2003 (DE) ................................ 103 61 158

(51) Int. Cl.
G05B 19/18 (2006.01)
G02B 21/00 (2006.01)
G02B 26/08 (2006.01)
G06K 9/00 (2006.01)
A61B 18/18 (2006.01)

(52) U.S. Cl. .................. 700/56; 359/368; 359/201; 359/210; 382/128; 606/4

(58) Field of Classification Search ............. 359/368, 359/201, 210; 382/128; 606/4
See application file for complete search history.

(56) References Cited

U.S. PATENT DOCUMENTS

| 5,000,555 | A | * | 3/1991 | Sato | 359/392 |
| 5,225,999 | A | * | 7/1993 | Luzzi | 702/85 |
| 5,260,825 | A | | 11/1993 | Nagano et al. | |
| 5,499,097 | A | | 3/1996 | Ortyn et al. | |
| 5,703,714 | A | * | 12/1997 | Kojima | 359/368 |
| 5,756,696 | A | * | 5/1998 | Gray et al. | 536/23.1 |

(Continued)

FOREIGN PATENT DOCUMENTS

DE    19839777    3/1999

(Continued)

OTHER PUBLICATIONS

International preliminary report on patentability for International No. PCT/EP2004/053256 mailed on Sep. 8, 2006.

(Continued)

*Primary Examiner*—Ronald D Hartman, Jr.
*Assistant Examiner*—Sunray R Chang
(74) *Attorney, Agent, or Firm*—Darby & Darby (57) ABSTRACT

A partially or fully automated microscope includes one or more configurable subassembly. Each subassembly has at least one element. The element can be configured in various positions. A computer, associated with the microscope and having an input device and display, also includes a database configured to store configurations of the element for the subassembly.

18 Claims, 12 Drawing Sheets

U.S. PATENT DOCUMENTS

| | | | |
|---|---|---|---|
| 6,133,561 A * | 10/2000 | Toshimitsu et al. | 250/201.3 |
| 6,235,014 B1 * | 5/2001 | Abe et al. | 606/4 |
| 6,700,659 B1 * | 3/2004 | Chunduri et al. | 356/237.5 |
| 6,961,080 B2 * | 11/2005 | Richardson | 348/80 |
| 2003/0044054 A1 * | 3/2003 | Olschewski et al. | 382/128 |
| 2003/0090789 A1 | 5/2003 | Herz et al. | |
| 2003/0161515 A1 * | 8/2003 | Salmon et al. | 382/128 |
| 2004/0190129 A1 | 9/2004 | Peter et al. | |
| 2005/0046930 A1 * | 3/2005 | Olschewski | 359/368 |

FOREIGN PATENT DOCUMENTS

| | | |
|---|---|---|
| DE | 19853407 | 5/2000 |
| DE | 10051299 | 4/2002 |
| EP | 1 445 635 | 8/2004 |
| WO | WO-96/18924 | 6/1996 |

OTHER PUBLICATIONS

International Search Report for International No. PCT/EP2004/053256 mailed on Mar. 16, 2005.

* cited by examiner

DEVICE AND METHOD FOR THE CONFIGURATION OF A MICROSCOPE

CROSS REFERENCE TO PRIOR APPLICATION

This is a U.S. national phase application under 35 U.S.C. §371 of International Patent Application No. PCT/EP2004/053256, filed Mar. 12, 2004, and claims benefit of German Patent Application No, 103 61 158.4, filed Dec. 22, 2003, which is incorporated by reference herein. The International Application was published in German on Jul. 7, 2005 as WO 2005/062104 A1 under PCT Article 21(2).

FIELD OF THE INVENTION

The invention relates to a device for configuring a microscope. In particular, the invention relates to a device for configuring an at least partially automated or motorized microscope, whereby the microscope comprises at least one configurable subassembly having several positions for different elements. and whereby a computer with a display and at least one input means is associated with the microscope.

Furthermore, the invention relates to a method for configuring a microscope. In particular, the invention relates to a method for configuring an at least partially automated or motorized microscope, whereby the microscope comprises at least one configurable subassembly having several positions for different elements, and whereby a computer with a display and at least one input means is associated with the microscope.

BACKGROUND

German Preliminary Published Application DE 198 39 777 describes an electric microscope. The invention described there males it easy to apply liquid onto a specimen when an immersion objective is moved into or out of the optical path. The microscope comprises an electric revolving nosepiece that carries several objectives. A nosepiece rotational position sensor detects the rotational position of the nosepiece in order to thus obtain information about the objective that is presently located in the optical path. The information as to whether the objectives are immersion objectives or dry objectives is stored in a storage unit. During the change-over from one objective to the next, the movement is stopped in the middle between two rotational positions if the objective currently located in the optical path or the next objective is an immersion objective. This middle position is indicated to the user in the form of a signal or an alarm. The objective data is entered using a data input unit. The objective data comprises the following: immersion objective, dry objective, magnification, working distance, numerical aperture, parfocal length. This data is stored in accordance with the position of the individual objectives in the nosepiece. The data can be recorded using a barcode reader or a numerical keypad. A drawback of the invention is that each microscope has to be associated with a data input unit and the data input cannot be extended to all motorized or automated elements of a microscope.

SUMMARY

It is an object of the present invention to create a device for programming and configuring individual components of an at least partially automated microscope, whereby the stand of the microscope is capable of reacting in an automated manner to the different microscopy methods It is another, alternative object of the present invention to provide a method with which the programming and configuring of individual components of an at least partially automated microscope are possible and, during operation, the stand of the microscope is capable of reacting in an automated manner to the different microscopy methods.

The present invention provides an apparatus including a microscope that is at least partially automated and includes at least one configurable subassembly having it least one element, the at least one element having a plurality of positions and a computer associated with the microscope, the computer includes a display, an input device, and a database configured to store respective configurations of the at least one element for the at least one configurable subassembly.

BRIEF DESCRIPTION OF THIEF DRAWINGS

Embodiments of the invention are schematically depicted in the drawings and described below with reference to the drawings, in which.

DETAILED DESCRIPTION

It is advantageous for the device for the configuration of an at least partially automated or motorized microscope to comprise at least one configurable subassembly. The at least one subassembly has several positions for different elements. A computer having a display and at least one input means is associated with the microscope. A database is implemented in the computer and all possible and available elements for the at least one configurable subassembly are stored in said database.

The at least one configurable subassembly is a motorized tube, or an incident light axis, or at objective nosepiece, or a Z-drive for setting the focus, or an X/Y-stage, or at least one lamp for the incident light illumination or transmission light illumination, or a condenser, or a plurality of control knobs.

Of course, it is advantageous and the operation is particularly convenient if all of the subassemblies of the microscope are automated. The configurable subassembly includes at least one of a motorized tube, and an incident light axis, and an objective nosepiece, and a Z-drive for setting the focus, and an X/Y-stage, and at least one lamp for the incident light illumination and/or transmission light illumination, and a condenser, and a plurality of control knobs.

Several user interfaces can be depicted on the display that is associated with the computer. The various user interfaces all consist of at least three areas. A first area of the user interface depicts a selection of at least three modules, the first module comprising the configuration of the microscope, the second module comprising the fine tuning and the third module comprising the operation of the microscope. A second area of the user interface comprises a tree that shows the user the various possibilities of the module from the first area that has been selected in each case. A third area of the user interface allows the user to make a precise selection of the submodule selected in the second area. The subassembly to be configured and the elements that can be selected for this module can be shown to the user in the third area of the user interface on the display of the computer. After the configuration has been completed, a process vector is calculated with the computer and stored in a storage unit in the stand of the microscope. The stand of the microscope has a display integrated into it on which the methods determined by the process vector and based on the configuration can be shown to the user. A warning is given to the user in case of an incorrect combination of optical elements.

Moreover, the method for configuring an at least partially automated or motorized microscope is advantageous. The microscope comprises at least one configurable subassembly having several positions for different elements. A computer having a display and at least one input means is associated with the microscope. The method is characterized by the depiction of a user interface on the display of the computer and by a selection of a first module for the configuration of the microscope. Subsequently, all of the configurable subassemblies are selected one after the other and the elements belonging to the selected subassembly are determined. Finally, the fine tuning of the configured subassemblies is carried out. After the configuration of the microscope and the fine tuning have been completed, the measuring procedure with the microscope is started.

Figure 1:
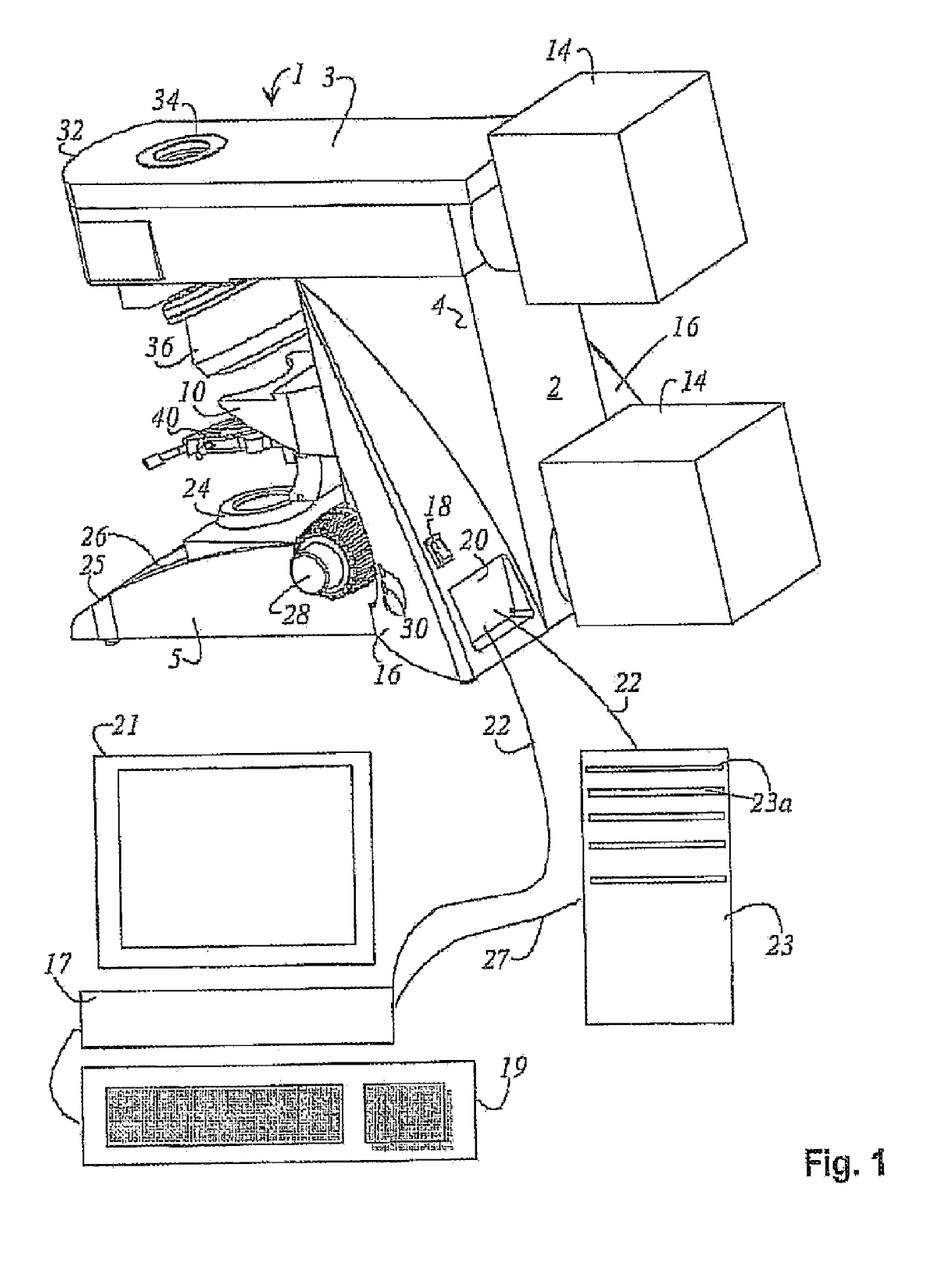
FIG. 1 shows a schematic depiction of a device for configuring a microscope.

A schematic view of the system according to the invention for configuring a microscope 1 is shown in FIG. 1. In the description, only an upright microscope is described, but it goes without saying that the invention can also be used for other types of microscopes such as, for example, an inverted microscope or a stereo microscope. The microscope 1 described here comprises a stand that consists of a base part 2. The base part 2 is divided into three main sections consisting of a transverse main section 3, a stand column section 4 and a stand foot section 5. An add on surface 12 is included on transverse main section 3 (shown in FIG. 2). A microscope stage holding element 10 is attached to the stand column section 4 and a filter holder 40 can likewise be provided on said microscope stage holding element 10. At least one light source 14 is provided on the stand column section 4 opposite from the microscope stage holding element 10. In the embodiment shown here, there are two light sources 14. One of the light sources 14 is used for the transmission light illumination and the other light source is used for the incident light illumination. There is a support element 16 on each side of the stand 2 in the area of the stand column section 4. Each of these two support elements 16 is shaped in such a way that they have the width of the stand column section 4 and they widen continuously and steadily, starting from the transverse main section 3 in the direction of the of the stand foot section 5.

In the embodiment shown in FIG. 1. a power switch 18 is provided on one of the support elements 16. Moreover, a connection element 20 is likewise shaped onto one of the support elements 16 and a power cable and/or at least one data cable 22 can be connected to the microscope 1 via said connection element 20. The stand foot section 5 is convexly curved in the area opposite from the stand column section 4 and has a display 26 in the convexly curved area 25. The display 26 can likewise be configured as a touchscreen that allows the user to enter parameters or to load certain measuring methods that are stored in an internal memory 47 (see FIG. 2) of the microscope 1. If the display 26 is not configured as a touchscreen, then current setting data of the microscope 1 is visually depicted via the display 26. Furthermore, a drive knob 28 with which, for example, the height of a microscope stage holding element 10 can be adjusted (in the Z-direction) is provided on both sides in the transition area between the stand foot section 5 and the support element 16. By the same token, it is conceivable to additionally assign other functions to the drive knob 28. Several control knobs 30 by means of which microscope functions can likewise be initiated are provided in the area around the drive knob 28. The microscope functions are, for example, filter change, diaphragm selection, nosepiece movement, etc. An ocular flange 34 is shaped onto the front part 32 of the transverse main section 3 and this flange creates an optical connection with an objective nosepiece 36 onto which at least one objective 37 (see FIG. 2) can be attached. A condenser 24 is provided opposite from the nosepiece 36. Moreover, a computer 17 is associated with the microscope 1. The computer 17 is provided with an input means 19 and a display 21. In the embodiment presented here, the input means 19 is a keyboard. However, it goes without saying that, aside from a keyboard, it is also possible to use other input means 19 such as, for instance, a mouse, joystick, etc. Depending on the degree of automation or motorization of the microscope 1, an electronics rack 23 is associated with the microscope 1. The electronics rack 23 comprises several electronic cards 23a of a standardized size that serve to control the various microscope functions.

Figure 2:
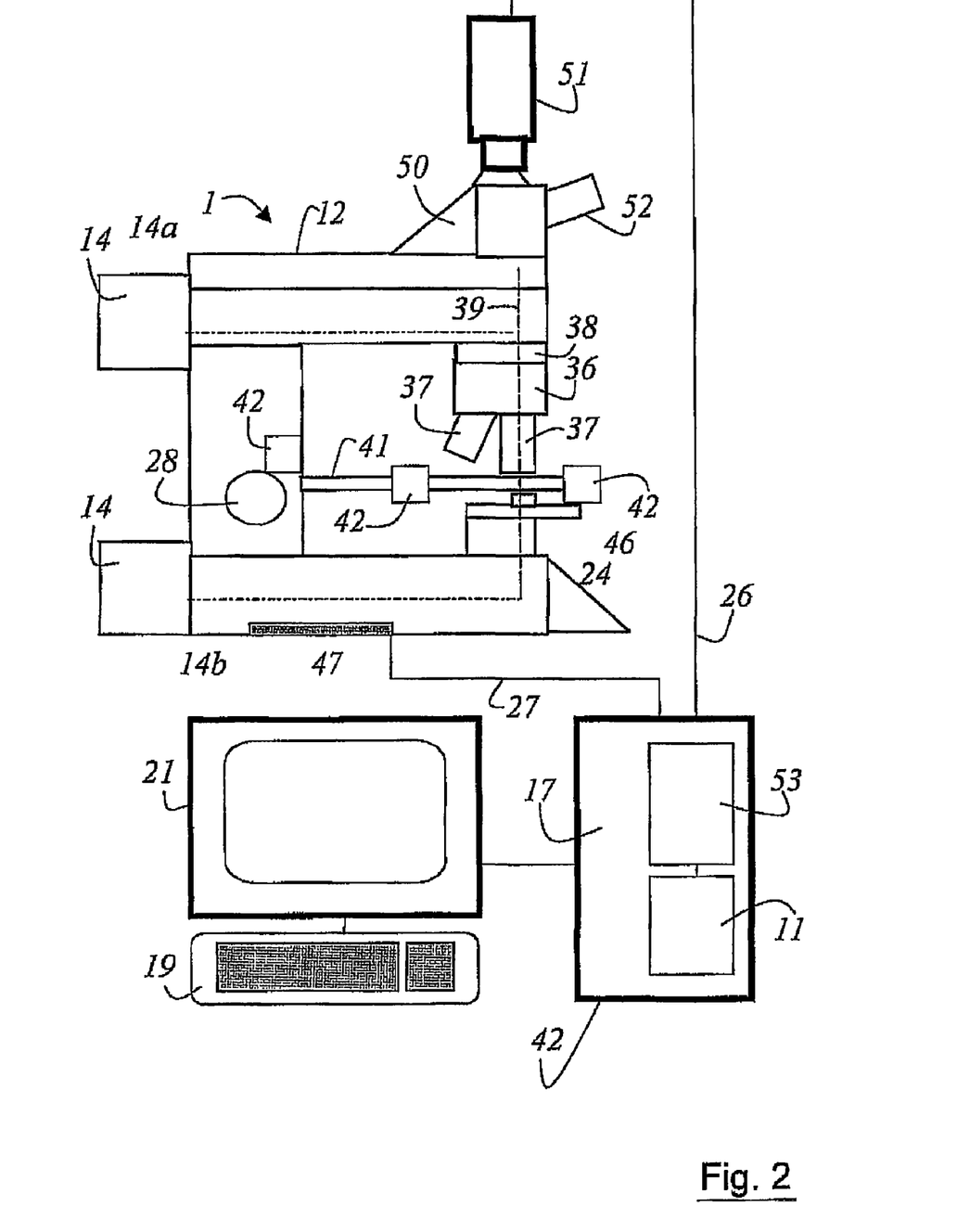
FIG. 2 shows a schematic depiction of a microscope and the various configurable subassemblies of the microscope 1.

FIG. 2 schematically shows a microscope 1 and the various configurable subassemblies of the microscope 1. One of the configurable subassemblies is an objective nosepiece 36. The data for each individual objective 37 is programmed. The objective nosepiece 36 is motorized and is turned by a motor 38 so that a selected objective is moved into the optical axis 39 of the microscope. The data that characterizes each objective 37 consists of the objective magnification, the article number of the objective (an unambiguous key for the job processing), the objective mode (DRY=dry objective, IMM=immersion objective, COMBI=combination of dry and immersion objective), the aperture, the step size in the Z-direction (focus) that is optimal for the appertaining objective 37 and the step size; X-/Y-shift (X/Y-stage) that is optimal for the appertaining objective. An X/Y-stage 41 is associated with the microscope 1, by means of which stage a specimen (not shown) placed onto the stage 41 can be moved in the desired direction. In each case, a motor 42 is provided in order to move the X/Y-stage 41 in the Z-direction (focus) and in the X-direction and Y-direction. Of course, the adjustment of the X/Y-stage in the Z-direction can also be done manually with the drive knob 28.

The illumination methods to be carried out with each objective 37 are likewise programmed. Accordingly, a lamp 14 is associated with the microscope 1 for an incident light axis 14a and another one for a transmission light axis 14b. The illumination methods supported by the objectives 37 are: BF-BF "bright field"; FLUO-DIC "fluorescence difference contrast"; FLUO-PH "fluorescence phase contrast"; FLUO "fluorescence"; IL-POL "incident light polarization contrast"; IL-DIC "incident light difference contrast"; IL-DF "incident light dark field"; IL-OBL "incident light oblique"; IL-BF "incident light bright field"; TL-POL "transmission light polarization contrast"; TL-DIC "transmission light difference contrast"; TL-DF "transmission light dark field"; TL-PH "transmission light phase contrast"; and TL-BF "transmission light bright field". By the same token, the values of the light sources 14 for the individual illumination methods are also programmed. In addition to this, there are the values for the aperture diaphragm for transmission Light for the appertaining method as well as the light field diaphragm for transmission light for the appertaining method. Of course, the values for the aperture of the diaphragm for incident light for the appertaining method as well as the light field diaphragm for incident light for the appertaining method are also programmed. Depending on the method, the position of the IC-disk to be set for the appertaining method is programmed. Moreover, the position of the condenser to be set is programmed for the appertaining method.

The data for the illumination axis (IL-axis) for fluorescence is programmed. This data comprises the name of the appertaining filter block, the article number of the filter block, the illumination method for which the filter block can be moved into the optical path (or illumination axis) and a dazzle protection (0→shutter opens again after the filter block change; 1→shutter remains closed after the filter block change). In order for the user not to be dazzled and for the specimen not to be damaged when the dark filter block is switched over the a slight filter block, the shutter is not automatically opened (1→shutter remains closed). The user now has to open the shutter manually by pushing a button or by using control software.

Programming is also performed in the case of the wheel (IC turret). The name of the appertaining filter block is programmed for each position.

The data for each position is programmed for the condenser 24 of the microscope 1. For example, the name of the prism to be swiveled into the optical path 39 or the name of the phase ring to be swiveled into the optical path 39 has to be programmed. Of course, the condenser 24 can also be motorized so as to automatically swivel the prism and the phase ring into the optical path 39 of the condenser.

A magnification changer 46 is likewise programmed. The article number and the number of positions of the magnification changer 46 are programmed. By the same token, the magnification values at the corresponding positions in the magnification changer 46 are entered. With the above-mentioned upright microscope, the magnification changer is located between the tube and the objective nosepiece in the optical path.

The configuration of a tube 50 of the microscope 1 (motorized and/or mechanical) is programmed. In this process, the article number of the tube 50 has to be entered. Therefore, along with the tube 50 used, the number of outputs is relevant. For example, the tube 50 can have an output for a camera 51 and an output for an eyepiece 52. Likewise, the light intensity can be distributed over the various outputs. A distribution of the light intensity would be, for example, 50% of the light intensity at the visual output and the remaining 50% at the output to the phototube. By the same token, it is important to program the article number of the employed eyepiece as well as the magnification associated with the eyepieces. The article number of the employed camera attachment likewise is programmed together with the magnification of the camera attachment.

As shown in FIG. 1, there are several control knobs 30 in the area around the drive knob 28. These function keys can be defined differently. Thus, the abbreviation of the key definition is entered during the configuration. Moreover, the command that is carried out when the key is actuated has to be defined during the configuration. By the same token, the command that is triggered when the function key is released has to be configured. In addition to this, there is the command repeat rate when the function key is held.

The basic procedure for programming or configuring the microscope 1 starts with the configuration of the objectives 37 that are arranged or that are to be arranged on the objective nosepiece 36. A storage image of an SQL database is used as the data source for the individual objectives 37. The SQL database is implemented in the memory 53 of the computer 17. The filter blocks are defined subsequent to the configuration of the objectives 37. Then come the prisms in the interference disk and the condenser 24. Now all of the requisite data has been entered. In the computer 17, software is implemented that is capable of calculating all of the methods that can be realized with the configured elements. A so-called process vector is calculated and written into a into memory 47 in the stand 2 of the microscope 1. Owing to the writing of the process vector into the stand of the microscope 1, the corresponding methods can be depicted on the display 26 of the microscope 1. This can then be done independently of the computer 17 that is connected to the microscope 1 for configuration purposes. Finally, as a function of the type of stand of the microscope 1 and of the available methods, the predetermined definitions of the control knobs 30 are calculated and likewise written into the stand 2 of the microscope 1. The microscope 1 is now read for use.

Magnification values that are present in the tube 52 are needed for the display of the total magnification. These are also needed for the calibration of the camera 51. In general, an attempt has been made to work with unambiguous article numbers in the case of complex elements such as, for example, objectives, fluorescence filter cubes, etc. In this manner, it can be ensured that the stand will behave in the same manner on different computers in terms of its programming.

After the configuration of the microscope 1 has been completed, so-called fine tuning is performed. The user can use the fine-tuning module to specify individualized settings. This program step builds directly on the configuration carried out on the microscope 1. All of the features for which the user can specify settings are depicted in a tree on a user interface that is shown to the user on the display 21 of the computer 17. The tree gives the user a clear depiction of the position in the configuration. Thus, an appropriate ranking can be stipulated by the user and it is clearly evident at every point in time which nodes have already been set and which ones still have to be processed.

Figure 3:
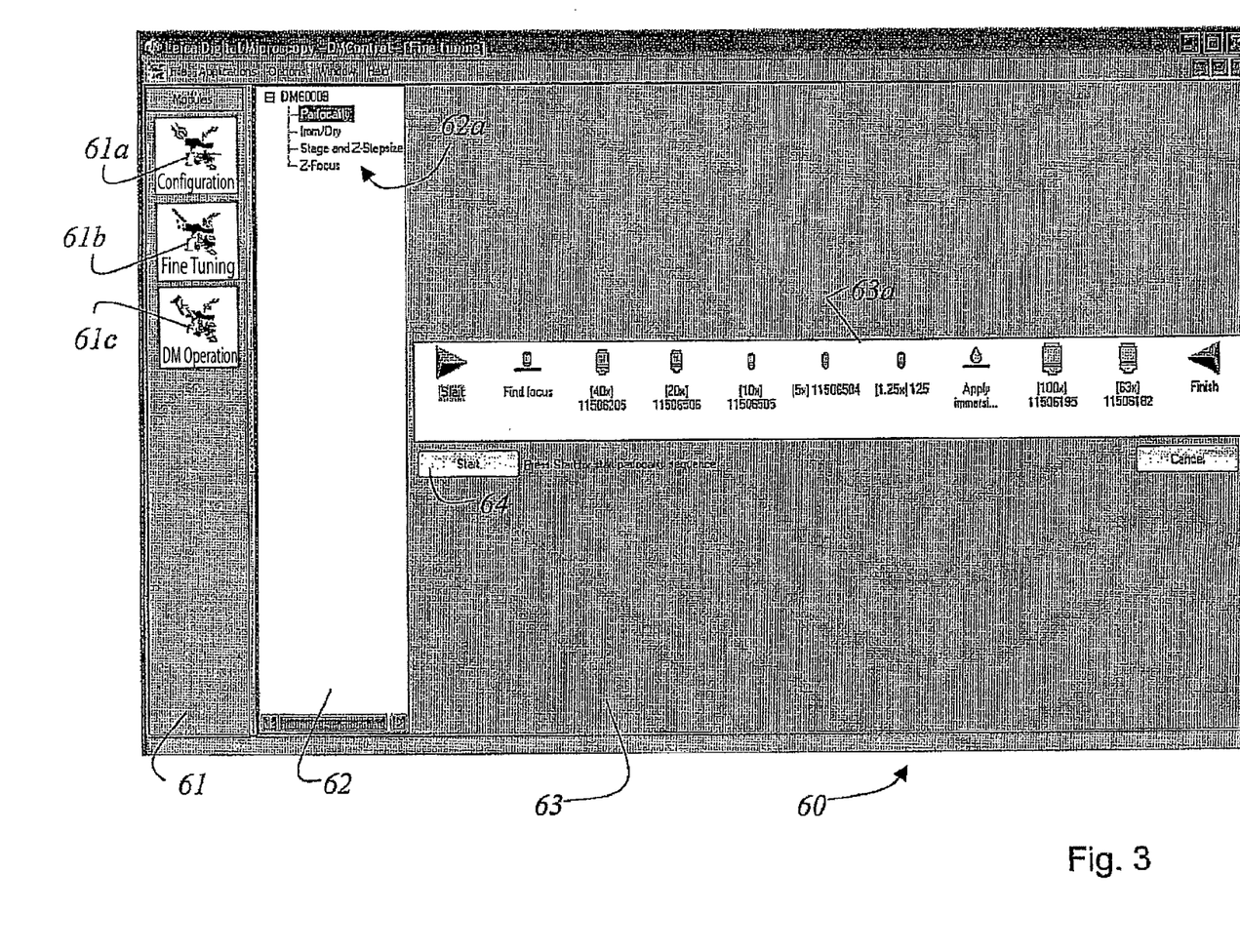
FIG. 3 shows a user interface with which the parfocality can be programmed.

The tree offers the user various setting possibilities. FIG. 3. for example, shows a user interface 60 with which the parfocality can be programmed. The user interface 60 is divided essentially into tree areas. In the first area 61, the individual modules 61a, 61b, 61c are depicted that can be selected by the user. The individual modules 61a, 61b, 61c are the configuration of the microscope 1, the fine tuning of the microscope 1 and the operation of the microscope 1. By making a selection, the user can access to the various modes. In the second area 62, a tree 62a is depicted that shows the user the various possibilities for the selected fine tuning. In the third area 63, the user is shown the selected fine tuning 63a. In this embodiment, the selected fine tuning is the programming of the parfocality. A start button 64 is associated with the third area 63, with which the user can start the programming of the parfocality. All of the user interfaces are structured according to the same pattern, namely, a first area 61, a second area 62 and a third area 63. These reference numerals are also retained for all additional user interfaces of this description. Nevertheless, the selected subdivision of the user interfaces should not be construed as a limitation. An aspect of the invention is that the user interface is depicted in the same general way for all stages of the calibration.

Figure 4:
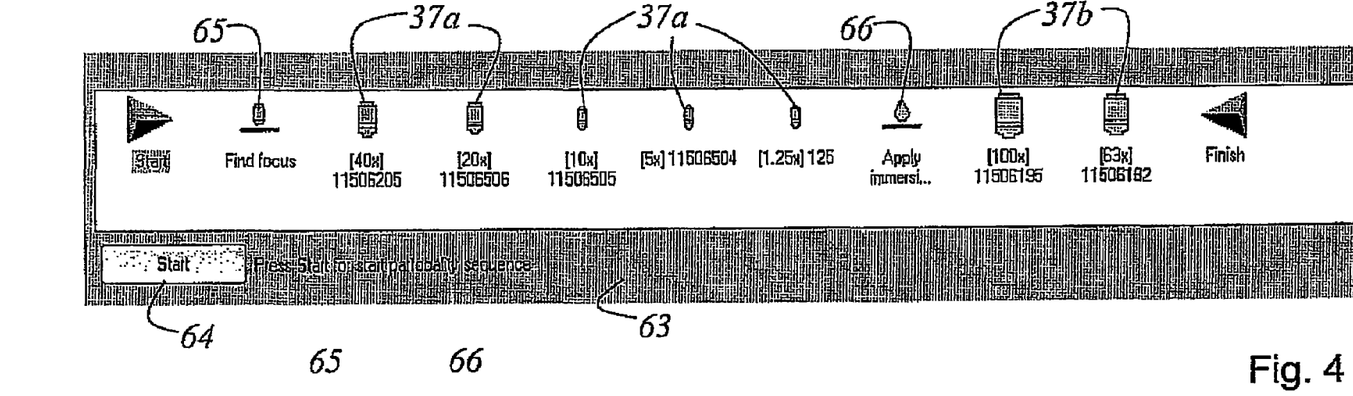
FIG. 4 shows an enlarged depiction of the third area of the user interface that depicts the sequence for programming the parfocality.

FIG. 4 is an enlarged depiction of the third area 63 of the user interface 60 that shows the sequence for programming the parfocality. A specific sequence has to be observed when the parfocality is programmed. This sequence arises from the objectives 37 defined in the configuration. The procedure starts with the dry objectives (DRY) and then continues with the immersion objectives (IMM). The objectives 37 are programmed in their order of descending magnification. The objectives 37 to be programmed are listed according to the depiction form of the third area 63. This list arranges all of the objectives 37 according to the pattern that the dry objectives 37a are arranged on the left-hand side of the third area 63 and the immersion objectives 37b on the right-hand side of the third area 63. Moreover, the dry objectives 37a and the immersion objectives 37b also differ in terms of a colored identification on the display 21. An additional first symbol 65 with the label "Find focus" and a second symbol 66 with the label "Apply immersion medium" assist the user in this work. The first symbol 65 serves to find tile position of the focus. With the second symbol 66, the user is prompted to apply an immersion medium.

Figure 5:
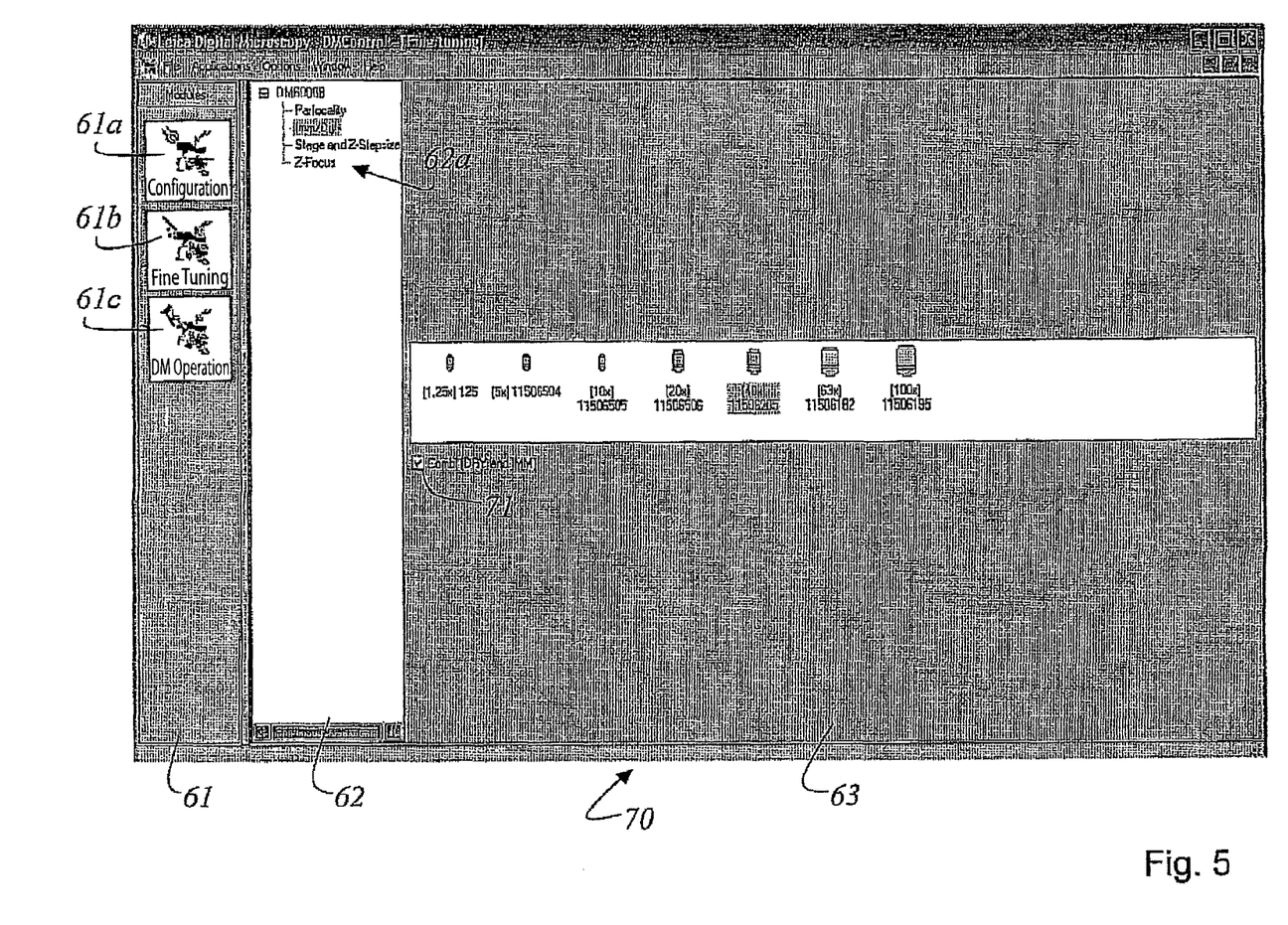
FIG. 5 shows a user interface with which the user can set the employed objectives independently of their objective properties.

FIG. 5 shows a user interface 70 with which the user can set, the use of the objectives 37 independently of their objective properties. This user interface 70 makes it possible to overwrite the property of the immersion objective (IMM) or of the dry objective (DRY) with a selection 71. This selection is a combination of the properties of the two objectives. This property is utilized when the user operates his stand in the mode for immersion objectives but would nevertheless like to access a dry objective (DRY). Normally, this is not possible.

Figure 6:
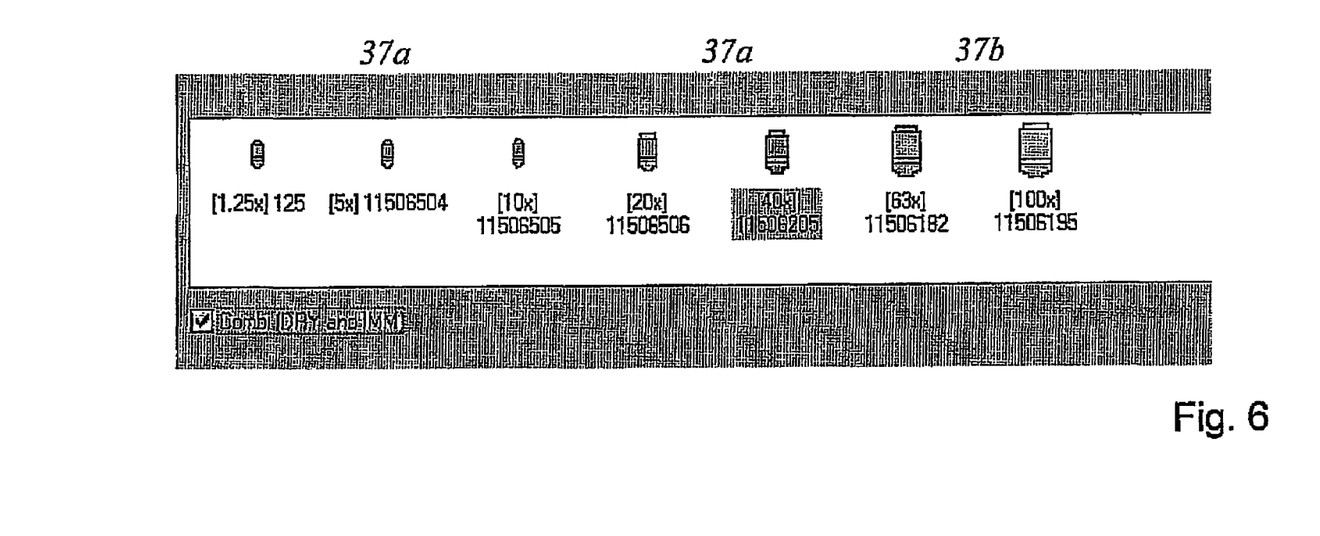
FIG. 6 shows an enlarged depiction of the third area of the user interface, with which the employed objectives can be changed.

FIG. 6 is an enlarged depiction of the third area of the user interface 70 with which the use of the objectives 37 can be changed. The objectives installed in the objective nosepiece are depicted in a lower window 71 of the third area of the user interface 70. Likewise, as already mentioned, the dry objectives 37a and the immersion objectives 37b are shown with a differently colored identification on the display.

Figure 7:
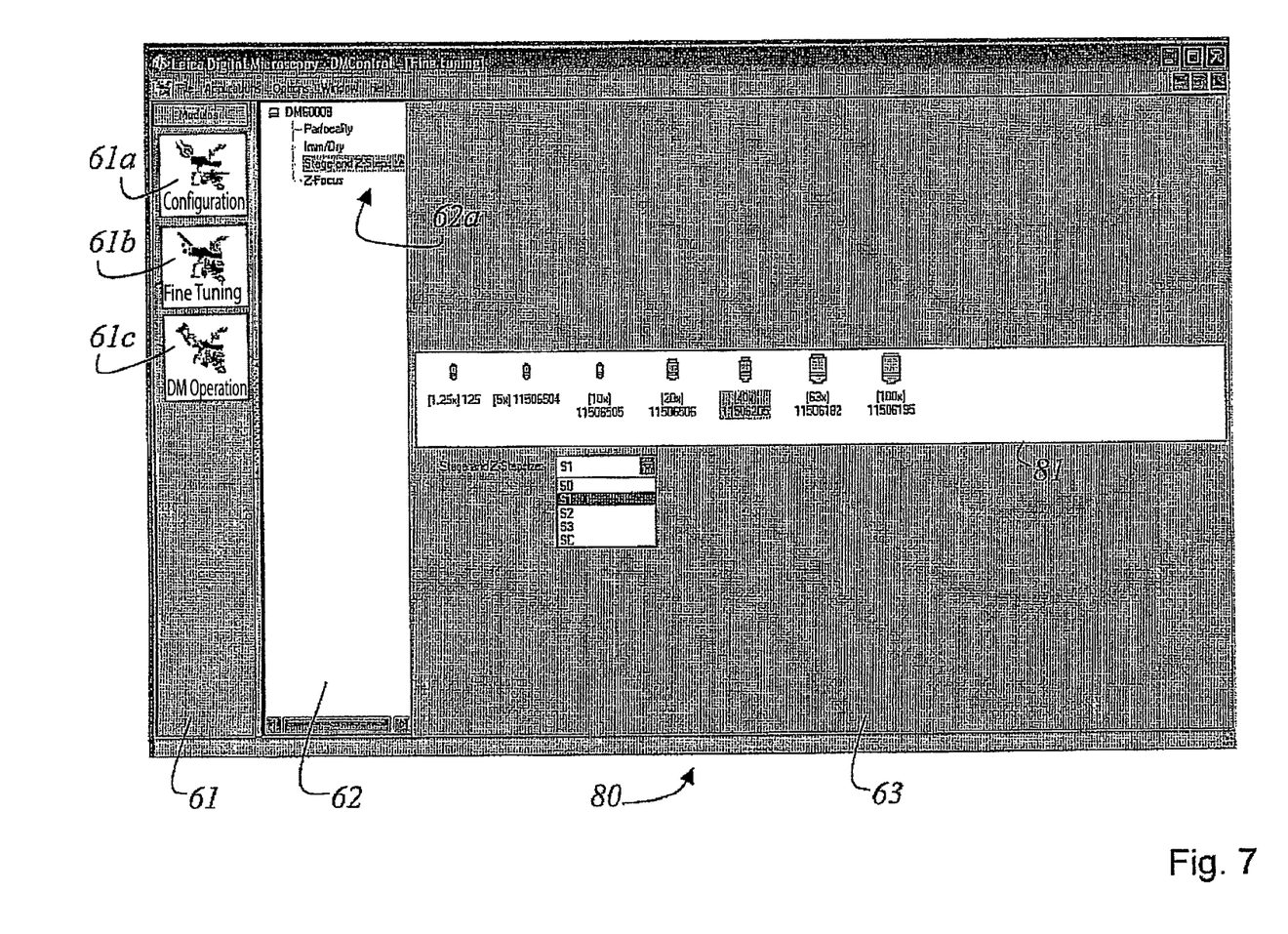
FIG. 7 shows a user interface with which the user can set the step size of the X/Y-stage in the Z-direction as a function of the objective located in the optical axis.
Figure 8:
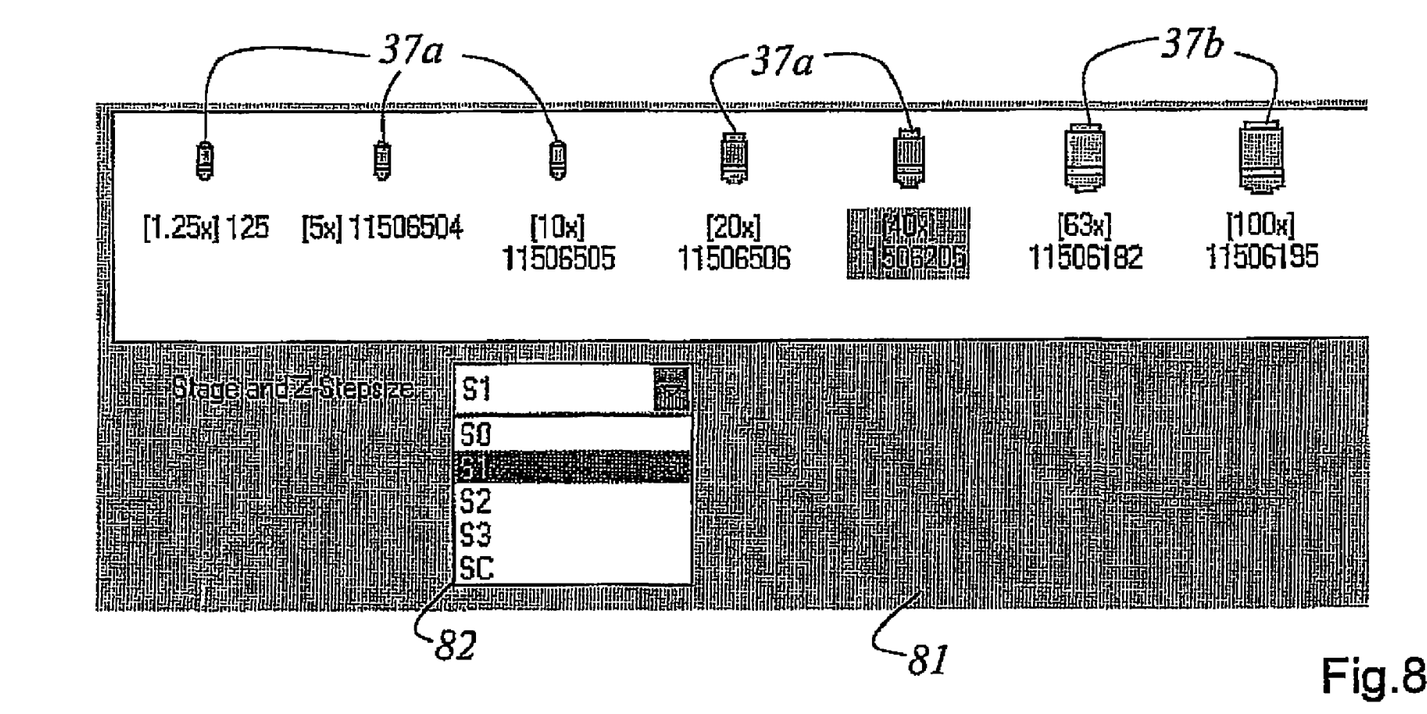
FIG. 8 shows an enlarged depiction of the third area of the user interface with which the employed objectives can be changed.

FIG. 7 shows a user interface 80 with which the user can set the step size of the X/Y-stage 41 in the Z-direction as a function of the objective 37 located in the optical axis. For this purpose, a selection window 81 (see FIG. 8) for the objectives 37 installed in the microscope is depicted in the third area 63 of the user interface 80. FIG. 8 shows an enlarged depiction of the selection window 81. A window 82 for setting and selecting the step size "Stage—Z-step size" of the X/Y-stage in the Z-direction is shown below the depiction for the objectives 37 (dry objectives 37a and immersion objectives 37b) installed in the microscope. The step size or "Stage—Z-step size" is the factor applied to the drive knob 28 for controlling the stage and the focus. Individually selectable steps from S0 (slow) to SC (fast) are defined in the window 82. A pre-setting is likewise calculated during the configuration of the microscope 1. In addition to the depiction of the individual objectives 37, the magnification and the article number associated with each particular objective 37 are indicated.

Figure 9:
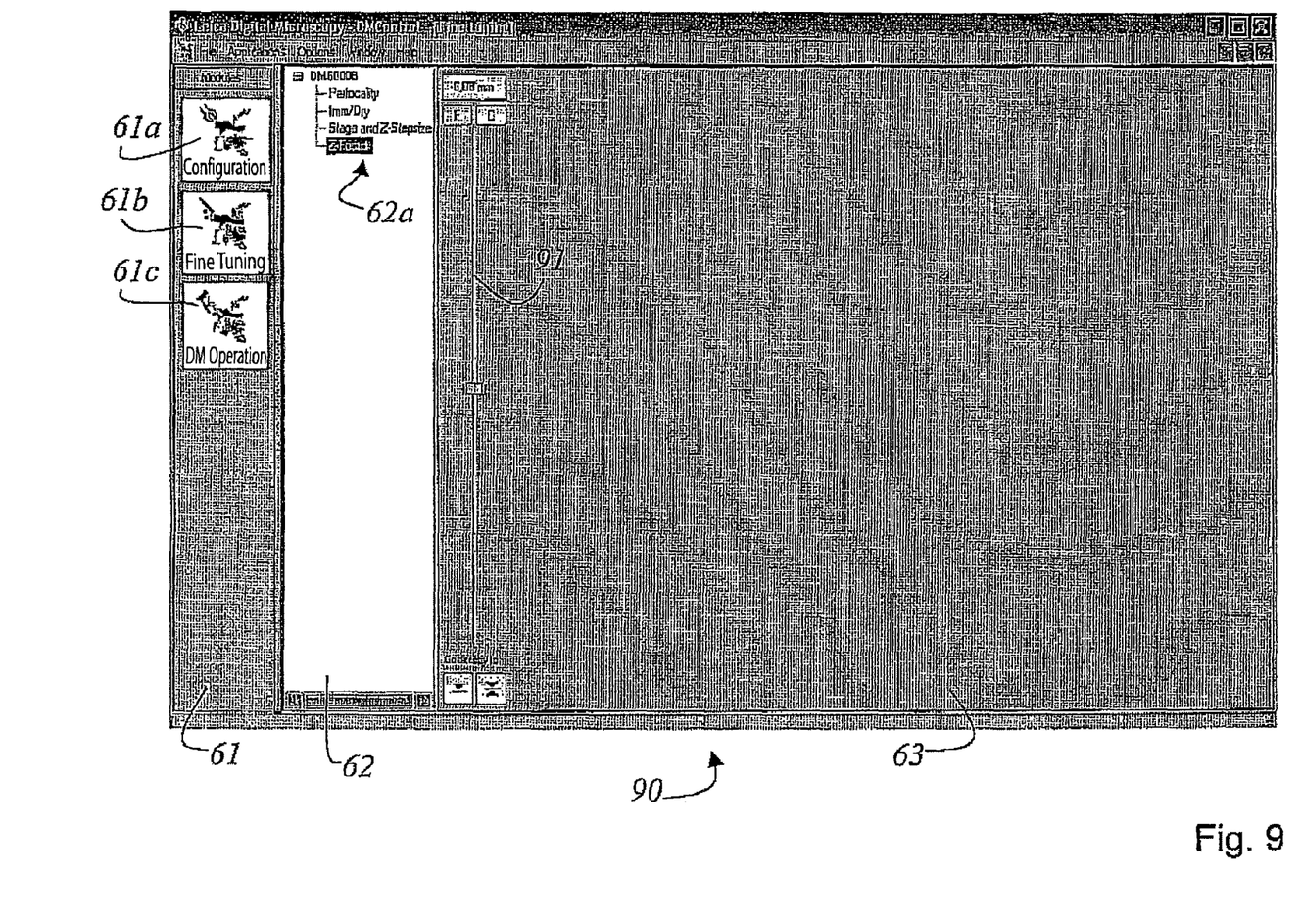
FIG. 9 shows a user interface with which the user can set the focus position.
Figure 10:
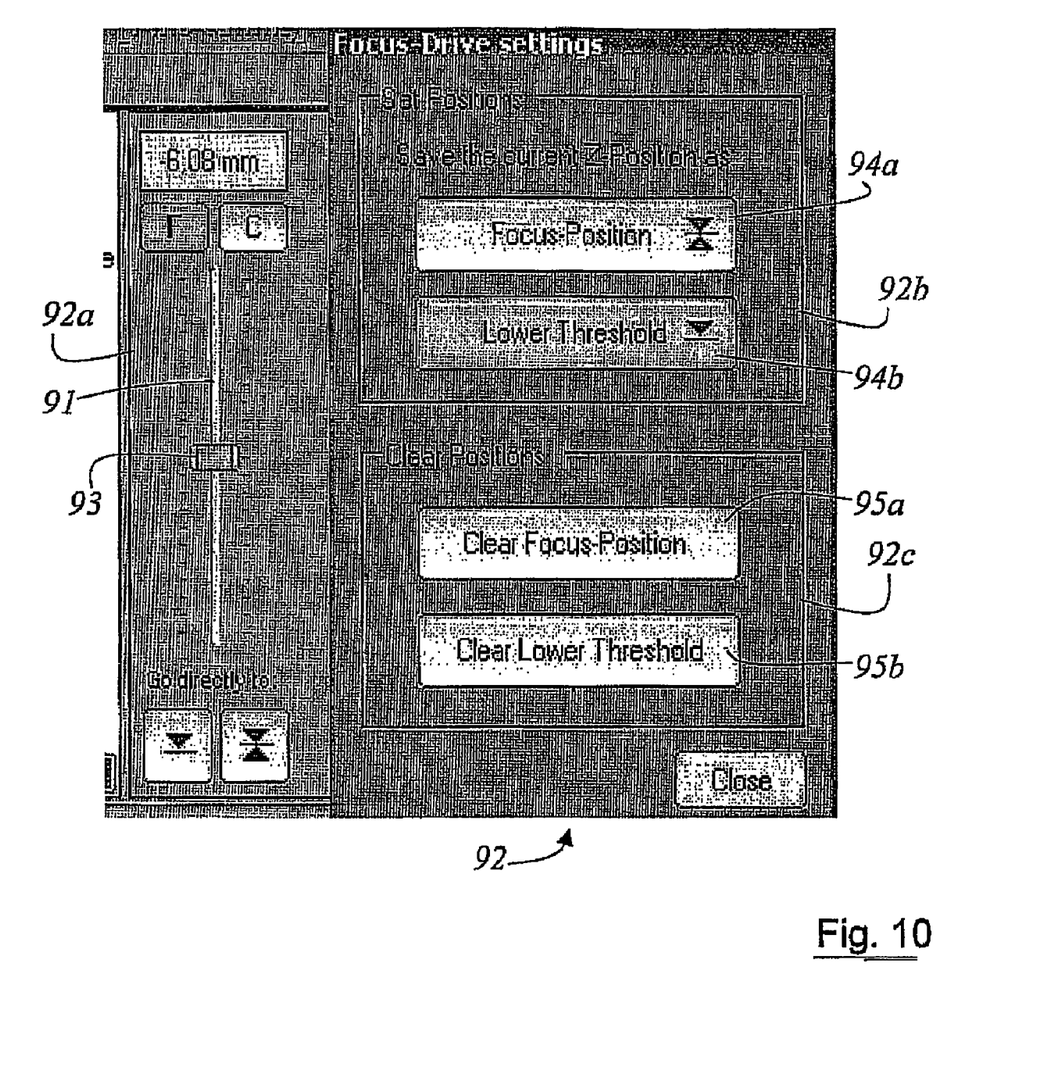
FIG. 10 shows an enlarged depiction of the third area of the user interface for settling the focus position.

FIG. 9 shows a user interfaces 90 with which the user can set the focus position. In the third area 63 of the user interface 90, a scale 91 is shown with which the user can set the desired positions for the focus. FIG. 10 shows an enlarged depiction 92 of the third area 63 of the user interface 90 for setting the focus position. The enlarged depiction 92 is divided into a first area 92a, a second area 92b and a third area 92c. The first area 92a comprises the scale 91 with which the desired focus position can be set by means of a slide 93. The second area 92b comprises a first and a second button 94a and 94b with each of which a value of the current Z-position "Save the current Z-position as" is set. The first button 94a is labeled "Focus Position" and, when it is actuated, the current Z-position is selected as the focus position. The second button 94b is labeled "Lower Threshold" and, when it is actuated, the current Z-position is selected as the lower threshold. The third area 92c comprises a first and a second button 95a and 95b with each of which a value of the current position can be cleared "Clear Position". The first button 95a is labeled "Clear Focus Position" and, when it is actuated, the selected focus position is cleared again. The second button 95b is labeled "Clear Lower Threshold" and, when it is actuated, the selected current lower threshold is cleared.

Figure 11:
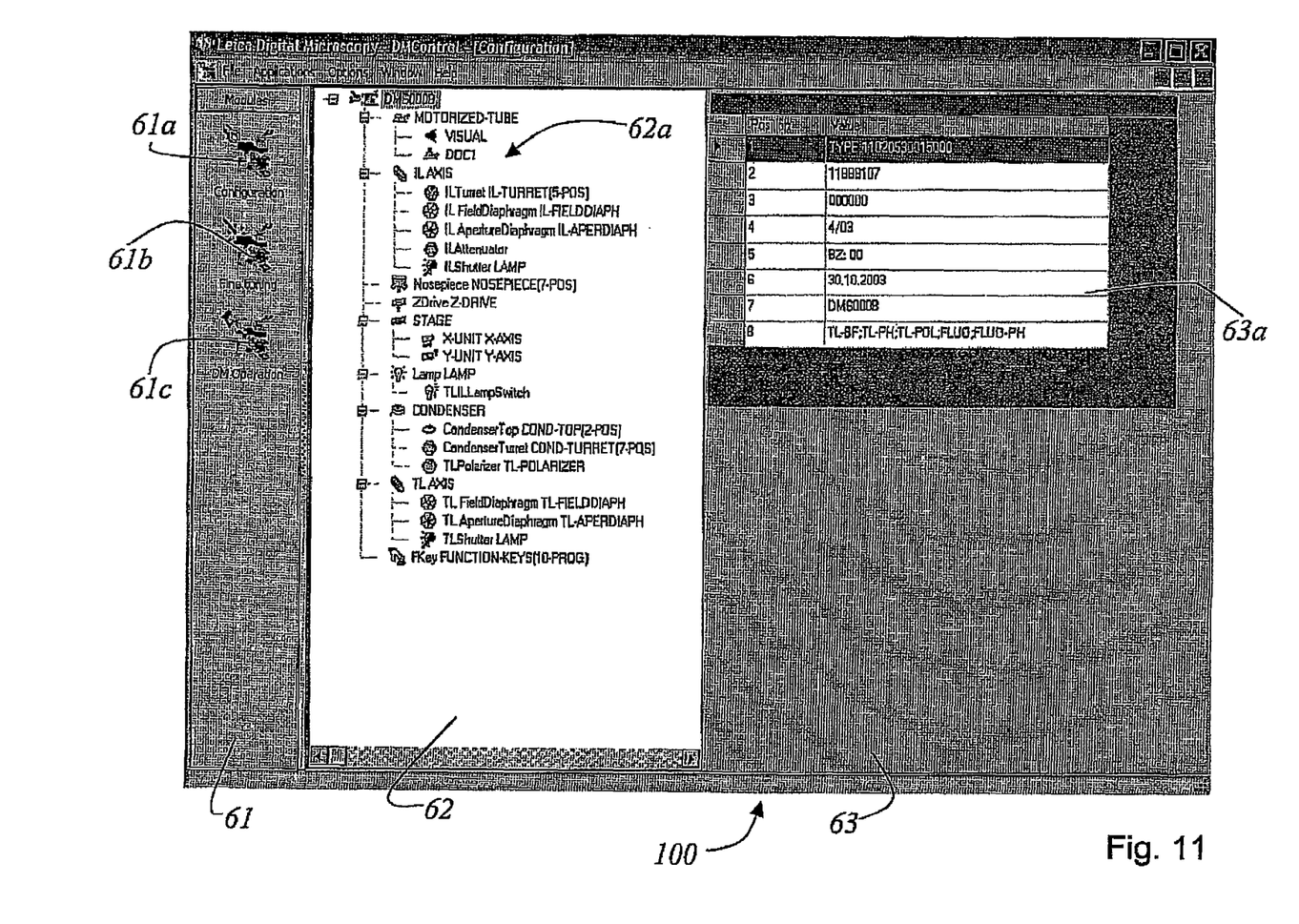
FIG. 11 shows a user interface for the configuration of the microscope.

FIG. 11 describes a user interface 100 for the configuration of the microscope 1. As already mentioned above, the basic structure of the user interface is the same for all of the modules. The user interface 100 is likewise divided essentially into three areas. In the first area 61, the individual modules 61a, 61b, 61c are depicted that the user can select. The individual modules 61a, 61b, 61c are the configuration of the microscope 1, the fine tuning of the microscope 1 and the operation of the microscope 1. The module 61a for the configuration of the microscope is selected in the depiction of the user interface 100 selected in FIG. 11. In the second area 62, a tree 62a is depicted that shows the user the various possibilities for the configuration of the microscope 1. In the third area 63, the user is shown the selected submodule for the configuration of the microscope 1. In the embodiment shown here, the selected submodule has the designation "DM6000B". This submodule serves to show the user the current configuration of the microscope. The tree 62a shows the user the various possibilities for the configuration of the microscope with the designation "DM6000B". Of course, the system according to the invention can also be used to configure other types of microscopes. The microscope with the designation "DM6000B" is structured with additional submodules. The submodules serve to configure the individual components of the microscope. A first submodule is labeled "MOTORIZED TUBE" and serves to configure the motorized tube 50. A second module is labeled "IL AXIS" and serves to configure the illumination axis in the microscope 1. This is where the various optical elements and components that the user would like to use in the microscopes can be entered. A third submodule is labeled "NOSEPIECE (7-POS)" and serves to configure the objective nosepiece 36 that, in this embodiment, has seven positions for screwing in objectives 37. A fourth submodule is labeled "Z-DRIVE" and serves to configure the Z-drive for setting the focus in the Z-direction (adjustment of the X/Y-stage in the Z-direction). A fifth submodule is labeled "STAGE" and serves to configure the X/Y-stage 41 in terms of its movement in the X-direction and in the Y-direction. A sixth submodule is labeled "LAMP" and serves to configure the lamp 14 or lamps 14 used for the illumination in the microscope 1. A seventh submodule is labeled "CONDENSER" and serves to configure the condenser 44. Here, the user can select various optical elements on the condenser 44 that can be swiveled into the illumination optical path of the microscope 1. An eighth module is labeled "TL AXIS" and serves to configure the illumination axis in the microscope for transmission light. This is where the various optical elements and components that the user would like to use in the microscope can be entered. A ninth module is labeled "FUNCTION KEYS (10-PROG)" and serves to configure the pushbutton switches or control knobs 30 that are provided on the stand or on the support elements connected to the microscope. In the embodiment shown in FIG. 11, the submodule "DM6000B" indicates the configuration of the entire microscope 1. The entire configuration of the microscope 1 is displayed in the third area 63 of the user interface 100 in the form of a table 63*a*.

Figure 12:
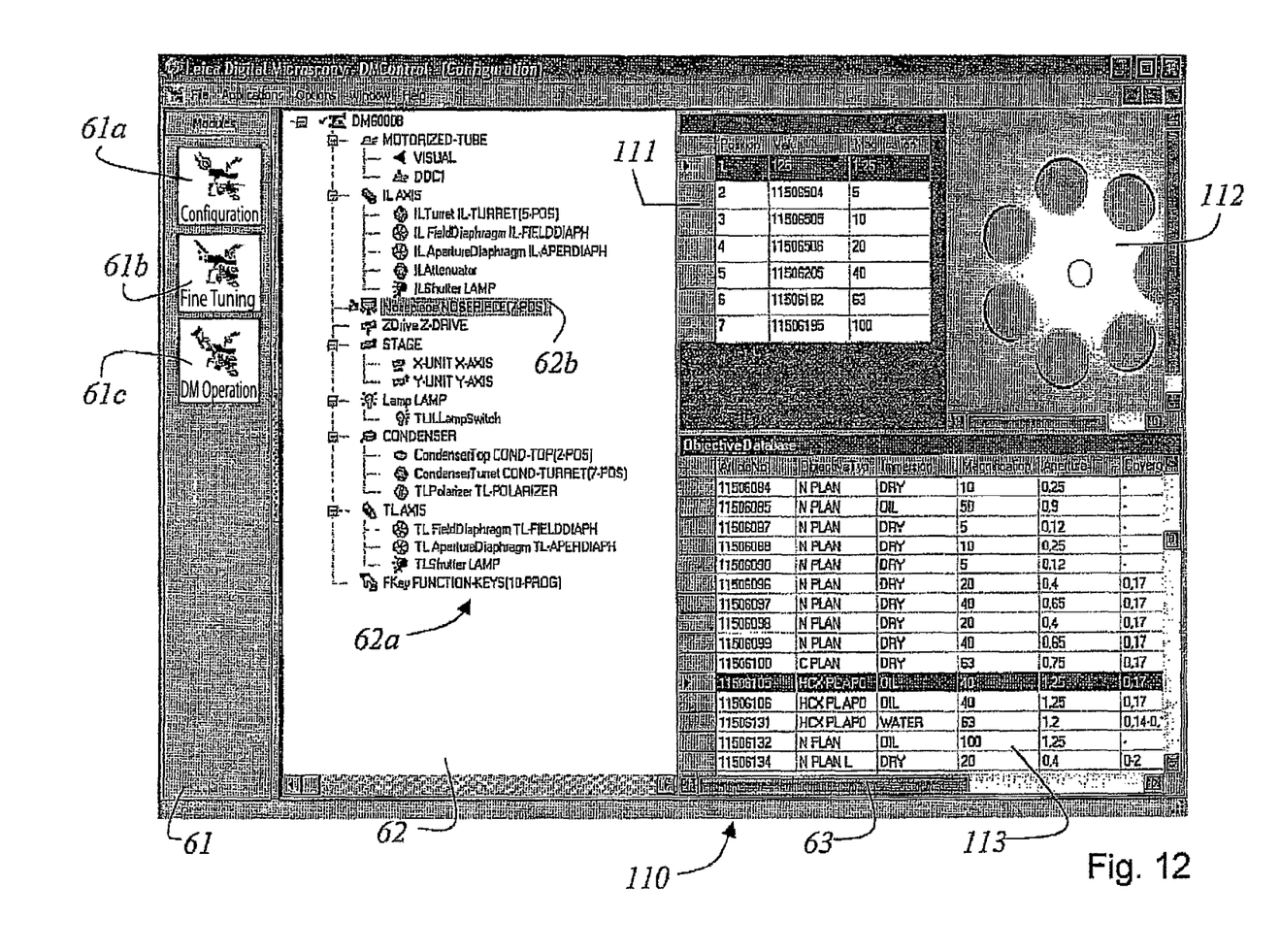
FIG. 12 shows a user interface for the configuration of the objectives that can be inserted into the nosepiece of the microscope.

FIG. 12 is a user interface 110 for the configuration of the objectives 37 that can be used in the objective nosepiece 36 of the microscope 1. In order to go to this user interface 110, the user has selected the submodule "NOSEPIECE (7-POS)" in the user interface 100. In the first area 61 of the user interface, the selected submodule "NOSEPIECE (7-POS)" is highlighted with a bar 62*b* or its selection is marked in some other way. The third area 63 of the user interface 110 is divided into three areas 111, 112 and 113. The first area 111 comprises a table in which the individual objectives are listed, for example, with their position in the nosepiece, their article numbers and their magnification. The second area 112 shows the graphic representation of an objective nosepiece 36, depicting a top view of the individual positions of the objective nosepiece 36. In a third area 113, the user is shown a table from which the user can select the individual objectives that are to be used in the nosepiece of the microscope. The selected objectives then appear automatically in the table in the first area. The table of die third area lists the objectives according to "article number", "objective type", "immersion", "magnification", "aperture", etc.

Figure 13:
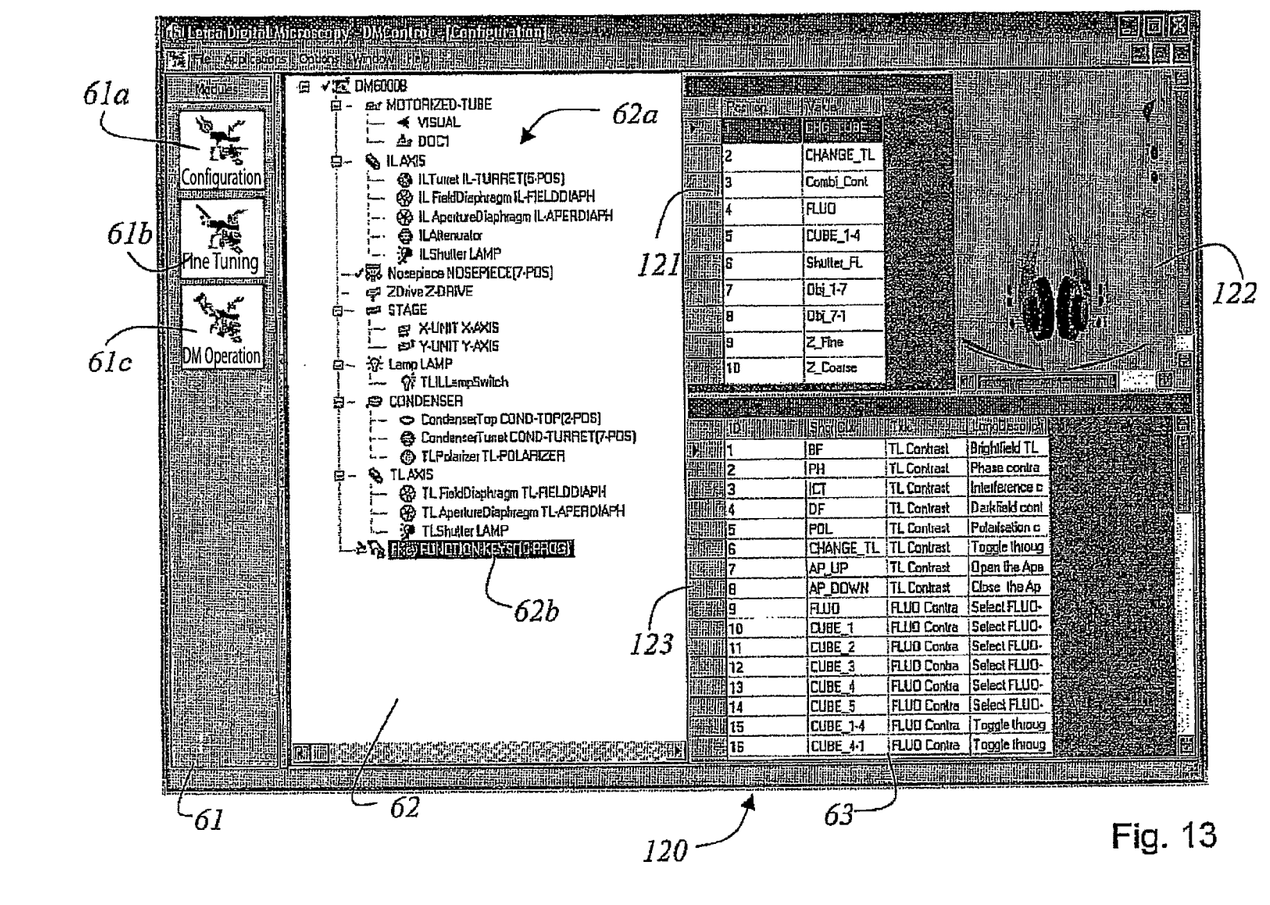
FIG. 13 shows a user interface for the configuration of the control knobs provided on the microscope.

FIG. 13 shows a user interface 120 for configuring the control knobs 30 provided on the microscope 1. As already mentioned in the description for FIG. 12, the user interface 120 is likewise divided into a first area 61, a second area 62 and a third area 63. In order to go to this user interface 120, the user has selected the submodule "FKey FUNCTION KEYS (10-PROG)" in the user interface 100. In the first area 61 of the user interface, the selected submodule "FKey FUNCTION KEYS (10-PROG)" is highlighted with a bar 62*b*. The third area 63 of the user interface 120 is divided into three areas 121, 122 and 123. The first area 121 comprises a table in which the positions of the individual control knobs 30 are listed with their position numbering. A column with the functions assigned to the control knob is listed in a column parallel to the column of the position numbering. The table depicted in the first area corresponds to the functionalities assigned by the user to the control knobs. The second area 122 contains the graphic representation of the stand parts of a microscope that carry the appertaining control knobs 30. The third area 123 shows the user a table from which the user can select the individual functions that can be assigned to the control knobs 30. The function selected and assigned to the appertaining control knob then appears automatically in the table in the first area 121. In the embodiment shown here, the microscope comprises, for example, ten control knobs to which the appertaining function mode can be assigned. The third area 123 of the user interface shows that the user is offered a considerable array of possibilities for selecting the functions for the control knobs. Only a few of these numerous possibilities will be described here by way of example. However, this is by no means to be construed as a limitation of the invention. Thus, for example, numerous contrasting methods for transmission light can be assigned to the control knobs 30. These illumination methods are labeled "TL Contrast" in the table of the third area 123. By the same token, the user can select numerous fluorescence contrasting methods. The fluorescence methods are labeled "FLUO-Contrast".

The invention claimed is:

1. An apparatus comprising:
   an at least partially automated microscope including at least one configurable subassembly having at least one element, the at least one element having a plurality of positions; and
   a computer associated with the microscope, the computer including:
      a display configured to depict a plurality of user interfaces, each user interface including at least three areas, a first area of a first user interface depicting a selection of at least three modules including a first module providing a configuration of the microscope, a second module providing a fine tuning and a third module providing an operation of the microscope,
      an input device, and
      a database configured to store respective configurations of the at least one element for the at least one configurable subassembly.

2. The apparatus as recited in claim 1 wherein the at least one configurable subassembly comprises at least one of a motorized tube, an incident light axis, an objective nosepiece, a Z-drive for setting a focus, an X/Y-stage, a lamp, a condenser and a control knob.

3. The apparatus as recited in claim 1 wherein the at least one configurable subassembly is automated.

4. The apparatus as recited in claim 3 wherein the at least one configurable subassembly comprises at least one of a motorized tube, an incident light axis, an objective nosepiece, a Z-drive for setting a focus, an X/Y-stage, a lamp, a condenser, and a control knob.

5. The apparatus as recited in claim 1 wherein a second area of the first user interface comprises a tree depicting a plurality of possibilities of a selected module of the at least three modules.

6. The apparatus as recited in claim 5 wherein a third area of the first user interface is configured to enable the user to make a selection among the possibilities of the selected module.

7. The apparatus as recited in claim 6 wherein the third area is configured to depict the at least one configurable subassembly and respective elements of the selected module.

8. The apparatus as recited in claim 1 wherein the computer is configured to calculated a process vector based on a first configuration of the at least one element and store the calculated process vector in a storage unit in a stand of the microscope.

9. The apparatus as recited in claim 8 wherein the stand of the microscope includes an integrated second display configured to depict a method determined by the process vector and based on the first configuration, and to provide a warning to a user in a case of an incorrect combination of a selected element of the at least one element.

10. A method for configuring an at least partially automated microscope including at least one configurable subassembly having at least one element having a plurality of positions, the method comprising:
   depicting a first user interface and a second user interface on a display of a computer associated with the microscope, the first and second user interfaces each including at least three respective areas, a first area of the first user interface depicting a selection of at least three modules including a first module providing a configuration of the microscope, a second module providing a fine tuning and a third module providing an operation of the microscope;

selecting a first module for configuring the microscope;

selecting the at least one configurable subassembly and determining the at least one element so as to configure the at least one subassembly;

performing fine tuning of the at least one configured subassembly; and starting a measuring procedure with the microscope.

11. The method as recited in claim 10 wherein the at least one configurable subassembly comprises at least one of a motorized tube, an incident light axis, an objective nosepiece, a Z-drive for setting a focus, an X/Y-stage, lamp, a condenser and a plurality of control knobs.

12. The method as recited in claim 10 wherein the at least one configurable subassembly is automated.

13. The method as recited in claim 12 wherein the at least one configurable subassembly comprises at least one of a motorized tube, an incident light axis, an objective nosepiece, a Z-drive for setting a focus, an X/Y-stage, a lamp, a condenser, and a control knob.

14. The method as recited in claim 10 wherein a second area of the first user interface comprises a tree depicting a plurality of possibilities of a selected module of the at least three modules.

15. The method as recited in claim 14 wherein a third area of the first user interface is configured to enable the user to make a selection among the possibilities of the selected module.

16. The method as recited in claim 15 wherein the third area of the first user interface is configured to depict the at least one configurable subassembly and respective elements of the selected module.

17. The method as recited in claim 10 further comprising:

calculating, using the computer, after the configuring of the at least one configurable subassembly, a process vector; and storing the calculated process vector in a storage unit in a stand of the microscope.

18. The method as recited in claim 17 wherein the stand of the microscope includes an integrated second display configured to depict a method determined by the process vector and based on the first configuration, and to provide a warning to a user in a case of an incorrect combination of a selected element of the at least one element.

* * * * *